(No Model.)
H. DRESES.
TURNING LATHE.
No. 493,018. Patented Mar. 7, 1893.
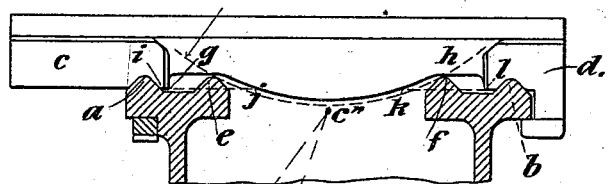
Fig. 1.
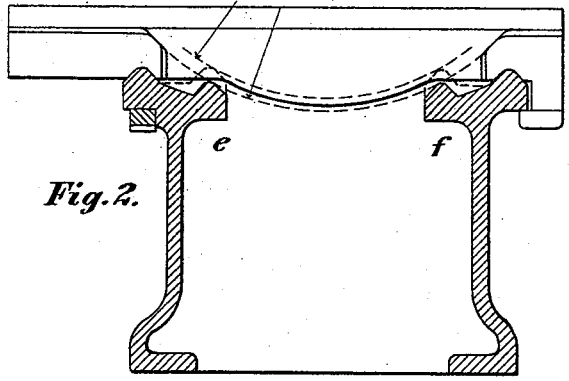
Fig. 2.
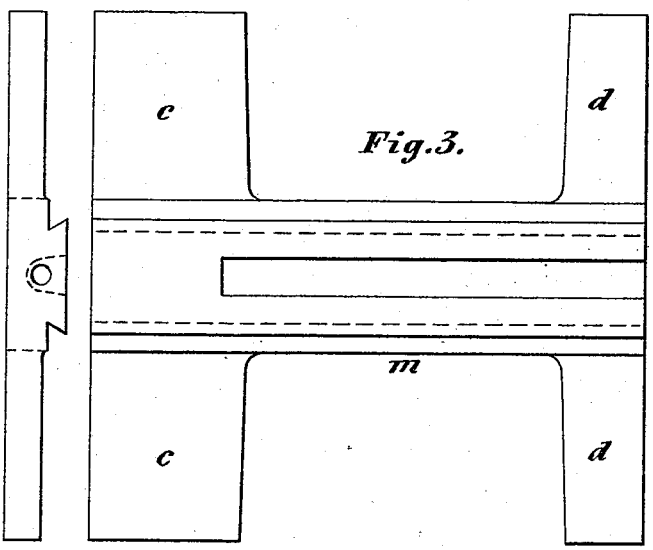
Fig. 4.
Fig. 3.
WITNESSES:
INVENTOR
Henry Dreses

UNITED STATES PATENT OFFICE.

HENRY DRESES, OF CINCINNATI, OHIO.

TURNING-LATHE.

SPECIFICATION forming part of Letters Patent No. 493,018, dated March 7, 1893.

Application filed April 6, 1892. Serial No. 428,022. (No model.)

*To all whom it may concern:*

Be it known that I, HENRY DRESES, a citizen of the United States, residing at Cincinnati, in the county of Hamilton and State of Ohio, have invented a new and useful Improvement in Turning-Lathes, fully described and represented in the following specification and drawings, forming part of the same.

My invention relates to the construction of the lathe shear and sliding carriage thereon, as will be hereinafter more fully described and specified.

The objects of my invention, are to provide a lathe carriage strengthened from twenty-five to thirty-five percent. in its weakest part (the crossbridge) over the present method of construction without decreasing the swing over the same by making it thicker, nor making it wider, which is very detrimental in the construction of a lathe by preventing the cutting tool to run up close to the head and tail stock centers or face plate. Furthermore to have a lathe shear maintaining in many respects, the advantageous form of the V-shaped ways for the head stock, tail stock and carriage, but at the same time, increase the swing over the ways without enlargement of the swing over the carriage.

In the accompanying drawings in which similar letters indicate similar parts, Figure 1 represents the now almost universal type of the American lathe-shear with the also well known carriage thereon. Fig. 2 shows my improved construction of the lathe shear in connection with the also improved construction of the carriage. Fig. 3 is a top view of carriage, and Fig. 4 is an end view of the same.

In Fig. 1 $a$ and $b$ represent the outside ways of the lathe shear, located under the front and back wings, $c$ and $d$ of the carriage. The inside ways for the head and tail-stock are denoted by $e$ and $f$, and $g$ and $h$ show the places at the under side of the cross bridge, $m$, where the carriage is weakened in the present construction, to clear the inside ways.

Fig. 2 shows my improved construction with the inside ways $e$ and $f$, so much below the outside ones, as to clear the carriage without any cutting on line $i\,j$ and $k\,l$. It is obvious that the inside ways can be lowered still more so as to start the concave line of the crossbridge direct from $i$ and $l$.

The circles struck from the centers $c'$ and $c''$ in Figs. 1 and 2, indicate the gain of the swing of the lathe without disturbing the outside ways.

Having thus set forth my invention, what I claim herein is—

In lathe shears having the inner V shaped ways which support the head-stock and tail-stock, located below the outside ways, which support the carriage; said ways being connected by an inclined portion of the shear frame, substantially as set forth.

HENRY DRESES.

Witnesses:
W. H. BURTNER,
J. M. DE ROSE.